Patented Dec. 15, 1925.

1,565,280

UNITED STATES PATENT OFFICE.

RALPH H. McKEE, OF NEW YORK, N. Y., ASSIGNOR TO JOSEPH G. DONALDSON, OF HAMILTON, OHIO.

PROCESS OF PRODUCING FERROZIRCONIUM.

No Drawing. Application filed July 28, 1921. Serial No. 488,227.

*To all whom it may concern:*

Be it known that I, RALPH H. McKEE, a citizen of the United States, residing in the borough of Manhattan, city, county, and State of New York, have invented certain new and useful Improvements in Processes of Producing Ferrozirconium, of which the following is a specification.

The object of this invention is to improve upon preexisting processes for producing ferro-zirconium in the respects, mainly, of reducing cost of the resulting product, of reducing the content of impurities in such product and of increasing the content of zirconium therein. For example, ferro-zirconium produced by fusing zirconium oxide or silicate and metallic aluminum in an electric furnace is open to objection in all these respects, the cost being relatively high, the impurities (aluminum and silica) being excessive and the zirconium content normally not exceeding ten or fifteen per centum. The invention is based upon the fact that zirconium oxide and iron sulphide react to give sulphide dioxide and an alloy of iron and zirconium. The chemical reaction is as follows:

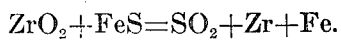

$$ZrO_2 + FeS = SO_2 + Zr + Fe.$$

In carrying out my process, I employ an oxygen compound of zirconium in a suitable form such as baddeleyite, zircon, zirconia, etc. This is mixed with iron sulphide and heated in an electric furnace at a temperature of from 1400° C. to 1800° C. During this process the constituents react with the evolution of sulphur dioxide gas and the zirconium dissolves in the excess of iron, the result being ferro-zirconium of high zirconium content. If baddeleyite be used, a zirconium content of about 40% may be obtained. If zircon be used, a lower zirconium content will result—approximately 20%.

The ferro-zirconium so produced will contain, as an impurity, a small quantity (approximately one or two per cent) of sulphur. This can be decreased by blowing the molten alloy with air or by heating it with a suitable slagging material. By the air treatment the sulphur may readily be reduced to approximately one quarter of one per cent—a negligible amount, and such treatment is preferred. If a slagging mixture be used, this may be added during the original fusion, but I prefer to add it to the final product as part of a refining or purifying process, conducted either in the same furnace or a different one as desired. Suitable slags are lime, fluorspar, gypsum, iron oxide, etc., or mixtures of the same. Of these the most convenient and efficient would seem to be iron oxide.

While I prefer to employ iron sulphide (FeS) as a reducing agent, I do not desire to limit myself thereto, as I may advantageously employ iron pyrites (FeS$_2$), a mixture of the same with iron (FeS$_2$+Fe), molybdenum sulphide (MoS$_2$), cuprous sulphide (CuS), manganese sulphide (MnS) or other metallic sulphide not readily volatile or a mixture of sulphides such as the ore-carrying copper and iron sulphides (chalcopyrite). My preference for iron sulphide or iron sulphide apart from its efficiency for the purpose described, is based upon its low cost and its availability in pure form, by reason whereof the resulting ferro-zirconium is reduced in cost as well as improved in quality as hereinabove explained.

I claim:

1. The process of producing zirconium alloy which consists in fusing an oxygen compound of zirconium with a metallic sulphide.

2. The process of producing zirconium alloy which consists in fusing an oxygen compound of zirconium with iron sulphide.

3. The process of producing zirconium alloy which consists in fusing an oxygen compound of zirconium with a metallic sulphide and treating the same for the removal of impurities.

4. The process of producing zirconium alloy which consists in fusing an oxygen compound of zirconium with a metallic sulphide and removing the sulphur by air blasting.

This specification signed and witnessed this 26 day of July, 1921.

RALPH H. McKEE.